United States Patent [19]

Yamamoto et al.

[11] Patent Number: 4,847,689
[45] Date of Patent: Jul. 11, 1989

[54] METHOD OF AND APPARATUS FOR TINT GENERATION AND COLOR SEPARATION OVER CLOSED REGIOONS OF AN IMAGE INCLUDING GENERATION OF RUN-LENGTH COLOR DATA

[75] Inventors: Yoshihisa Yamamoto, Moriyama; Masahiko Sarumaru, Osaka, both of Japan

[73] Assignee: Dainippon Screen Mfg. Co., Ltd., Kyoto, Japan

[21] Appl. No.: 27,214

[22] Filed: Mar. 17, 1987

[30] Foreign Application Priority Data

Mar. 17, 1986 [JP] Japan .................................. 61-60442

[51] Int. Cl.$^4$ ........................... G03F 3/08; H04N 1/46
[52] U.S. Cl. ............................................. 358/80; 358/75
[58] Field of Search ........................ 358/75, 76, 78, 80

[56] References Cited

U.S. PATENT DOCUMENTS

| | | | |
|---|---|---|---|
| 4,180,330 | 12/1979 | Kotera et al. | 358/75 |
| 4,189,743 | 2/1980 | Schure et al. | 3258/75 |
| 4,189,744 | 2/1980 | Stern | 358/75 |
| 4,301,469 | 11/1981 | Modeen et al. | 358/75 |
| 4,503,457 | 3/1985 | Ikuta et al. | 358/75 |
| 4,553,172 | 11/1985 | Yamada et al. | 358/75 |
| 4,646,355 | 2/1987 | Petrick et al. | 358/284 |
| 4,683,500 | 7/1987 | Kitamura et al. | 358/78 |
| 4,692,796 | 9/1987 | Yamada et al. | 358/78 |
| 4,775,886 | 10/1988 | Hirosawa | 358/75 |

FOREIGN PATENT DOCUMENTS

| | | | |
|---|---|---|---|
| 54-102825 | 8/1979 | Japan | 358/75 |
| 54-111213 | 8/1979 | Japan | 358/75 |
| 60-260954 | 12/1985 | Japan | 358/75 |
| 2105945 | 3/1983 | United Kingdom | 358/75 |

OTHER PUBLICATIONS

Miles Southworth, *Pocket Guide to Color Reproduction*, second edition, Graphic Arts Publishing Company, Livonia, New York, 1987, p. 104, "tint".

*Primary Examiner*—James J. Groody
*Assistant Examiner*—Randall S. Svihla
*Attorney, Agent, or Firm*—Lowe, Price, LeBlanc, Becker & Shur

[57] ABSTRACT

An original image in the form of a negative is scanned and converted into pixel data. The resultant data is compared with a predetermined threshold level value to discriminate pixels constituting the contour lines of the scanned image which are thickened to connect line gaps and form closed regions with corresponding first run-length data generated. Colors corresponding to desired tints are designated for each region and corresponding code data is associated with the run-length data to form second run-length data. The color code is converted into halftone-dot percentages and the photosensitive material is exposed to one or more color separations forming the desired tint to produce a tinted recorded image.

8 Claims, 18 Drawing Sheets

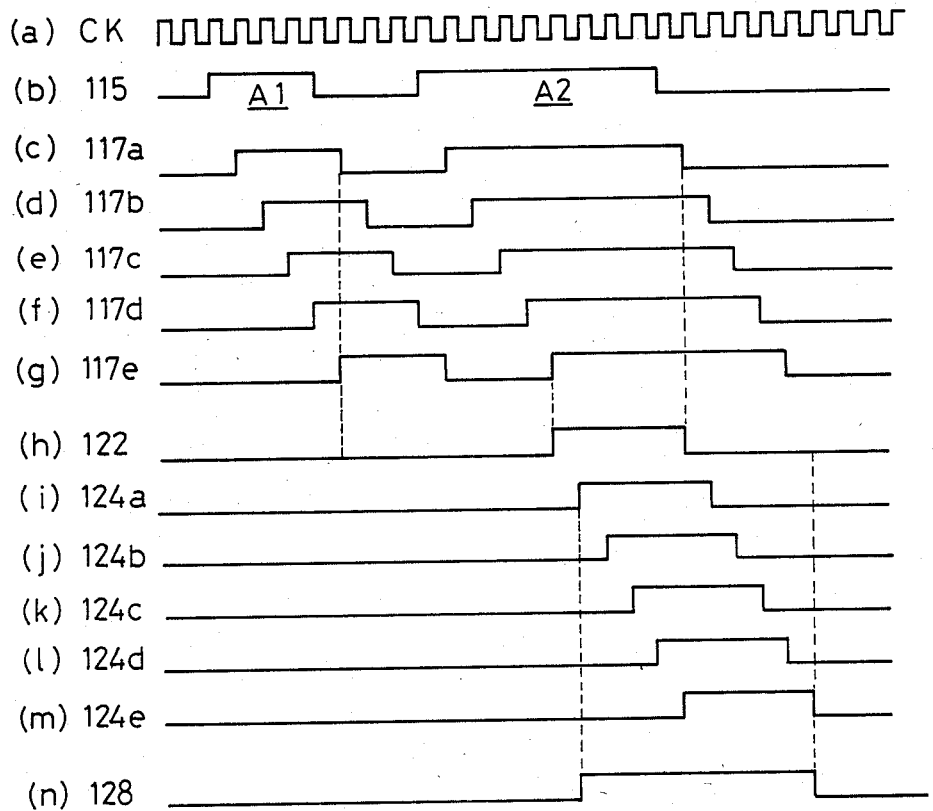

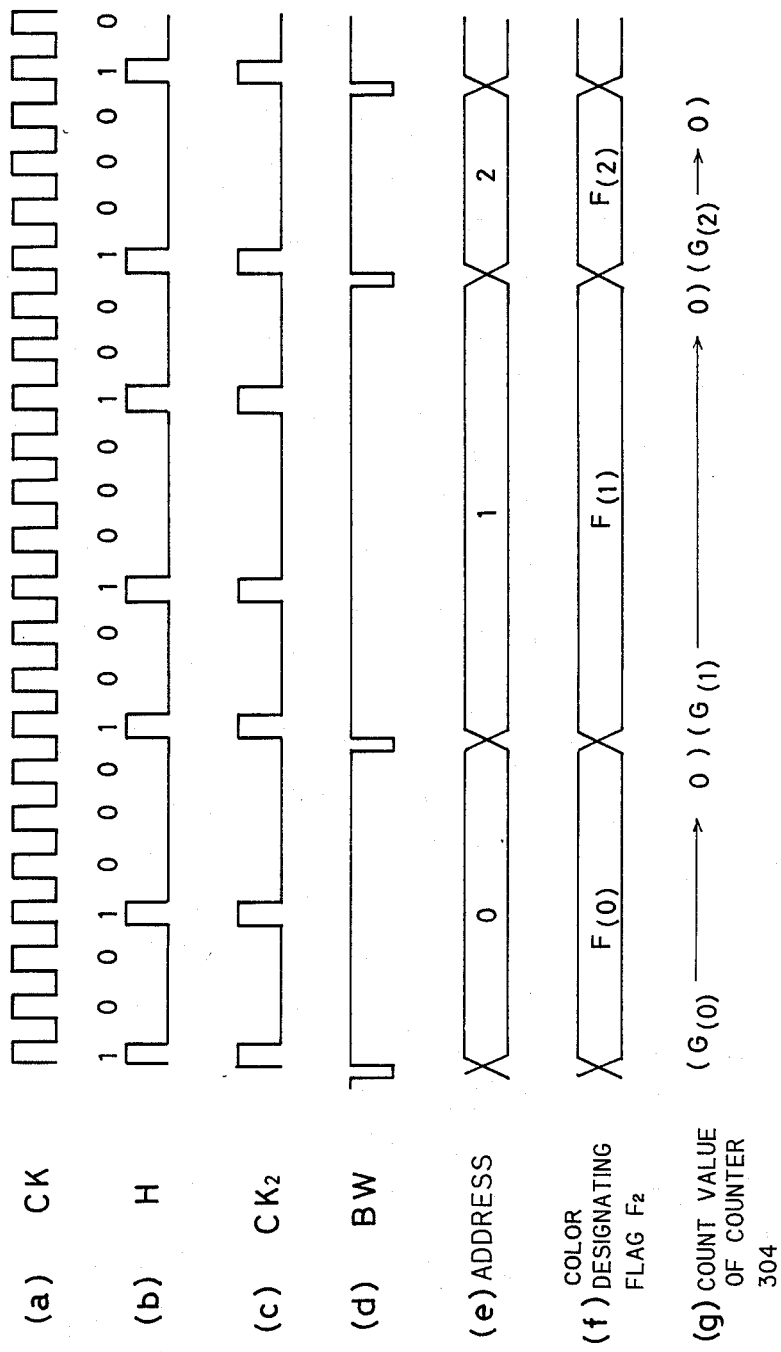

METHOD OF AND APPARATUS FOR TINT GENERATION AND COLOR SEPARATION OVER CLOSED REGIOONS OF AN IMAGE INCLUDING GENERATION OF RUN-LENGTH COLOR DATA

BACKGROUND OF THE INVENTION

The present invention relates to a method of tint generation and apparatus therefor for producing color separation negatives or positives bearing uniform sized halftone dots (i.e., screen tint) in predetermined regions which correspond to those of an original image.

When producing such negatives or positives from an original image e.g. a map or a hand-drawn illustration, a desired halftone-dot percentage is designated for respective regions thereof. In the case of color printing, such a designation of the halftone-dot percentage is performed for respective color separations of yellow, magenta, cyan and black (hereinafter referred to as Y, M, C, and K, respectively), and the preparation of printing plates is performed by employing the four color separation films thus produced and another film representing contour lines of the respective closed regions. The film representing contour lines is obtained by photographically copying a comprehensive, in which necessary correction is made so as to represent contour lines thereon.

The processing for producing screen tints in the respective regions an image, has conventionally been performed by hand, and therefore, complicatedness and skillfulness are required therefore, hence it is time-consuming. In this regard, some techniques for automating such processing have been proposed.

U.S. Pat. No. 4,503,457, patented to Ikuta et al. discloses one of such automatic techniques. However, Ikuta et al. requires an operator to paint out manually respective close regions of an original, and especially in case that the original includes complex regions to be painted the operator is compelled to complicated manual operations as in the conventional technique.

The tint generation can be carried out nowadays by a so-called layout scanner system. An example of such a layout scanner system is disclosed in U.S. Pat. No. 4,553,172, patented to Yamada et al., wherein the screen tint is effectively produced on a reproduced image. In such layout scanner system, however, it is necessary to provide a memory means having large capability, since all pixel data have to be stored therein in order to make desired processings, such as image layout or rotation, retouching, tinting, gradation correction, tone change and so on.

SUMMARY OF THE INVENTION

Accordingly, it is a prime object of the present invention to provide a method of tint generation and an apparatus therefor which carry out a desired tint generation on predetermined regions of an image readily and correctly with simple operations and with a simple structure of the apparatus.

It is another object to release an operator from complicated and troublesome operations for producing a resultant image with desired screen tints in predetermined regions thereof.

It is a further object to remove unwanted pinholes which are included in the original image, thereby producing a resultant image having desired screen tints, without any pinholes thereon.

According to the present invention, a method of tint generation comprises the steps of: (1) preparing an original image bearing contour lines thereon which define respective regions of said image; (2) scanning said image for obtaining pixel data thereof; (3) converting said pixel data into binary data with reference to a predetermined threshold level, thereby discriminating pixels of contour lines from the others; (4) thickening pixels of the contour lines, thereby connecting undetected line gaps to form closed regions; (5) further converting said binary data into first run-length data; (6) designating desired colors to the respective regions of the image while monitoring said image; (7) giving code data to said first run-length data in response to the designation of color, in respect of the respective regions, said code data representing colors designated, thereby obtaining second run-length data; (8) obtaining recording data, which represent halftone-dot percentages corresponding to respective color separations, on the basis of said code data affixed to said second run-length data; and (9) controlling the recording on a photosensitive material by said recording data, whereby desired tints are effected to the respective regions of the image.

Preferably, the method further comprises the step, between the steps (3) and (5), of: removing unwanted pinholes having pixels less than a predetermined number, said pixels being represented in the binary data as contour lines. The step is preferably carried out by: designating the number of pixels to be removed; narrowing the pixels representing the contour line by the number thus designated, thereby eliminating the pinholes having pixels less than the designated number; and thickening the pixels representing the contour line by the number thus designated, thereby reforming the contour lines not to be eliminated.

According to the invention, an apparatus for effecting tint generation in respective regions of an image, comprises: means for obtaining pixel data of the image, said image bearing contour lines of respective regions thereof; first converting means for converting said pixel data into binary data, thereby discriminating pixels of contour lines from the other; line thickening means for thickening pixels of the contour lines, thereby connecting undetected line gaps to form closed regions; second cnvering means for converting the binary data thus thickened in respect of the contour lines, into first run-length data; color designating means for designating colors to the respective regions of the image, designation of colors being given in the form of code data; third conveting means for converting said first run-length data into second run-length data to which said code data of color designation in respect of the respective regions of the image is affixed; and means for obtaining halftone-dot percentages corresponding to respective color separations, on the basis of said code data, whereby generating desired tints in the respective regions of the image.

Preferably the apparatus further comprises means for removing unwanted pinholes having pixels less than a predetermined number, wherein said removing means comprising: means for designating the number of pixels to be removed, said pixels being represented as contour line; a series of D-flip-flops connected in series; OR gates connected to respective D-flip-flops and said designating means respectively; an AND gate connected to said OR gates, whereby narrowing the pixels representing contour line by the number designated, to eliminate the pinholes having pixels less than the designated number.

Means for removing pinholes, preferably, further comprises: means for designating the number of pixels to be thickened, which is identical to that to be removed; a series of D-flip-flops connected in series; AND gates connected to respective said D-flip-flop and said designating means respectively; and an OR gate connected to said AND gates, whereby thickening the pixels by the number designated, to reform the contour lines not to be eliminated.

These and other objects and advantageous features of the present invention will become more apparent from the following detailed description when taken in conjunction with the accompanying drawings.

BRIEF DESCRIPTION OF THE DRAWINGS

FIG. 9 is a timing chart showing operations of the automatic pinhole removing circuit.

FIG. 21 is a timing chart showing a reading operation of line memories 302a and 302b accompanied with pixel enlargement processing.

DESCRIPTION OF THE PREFERRED EMBODIMENT

A. Entire Structure of Embodiment

Figure 1:
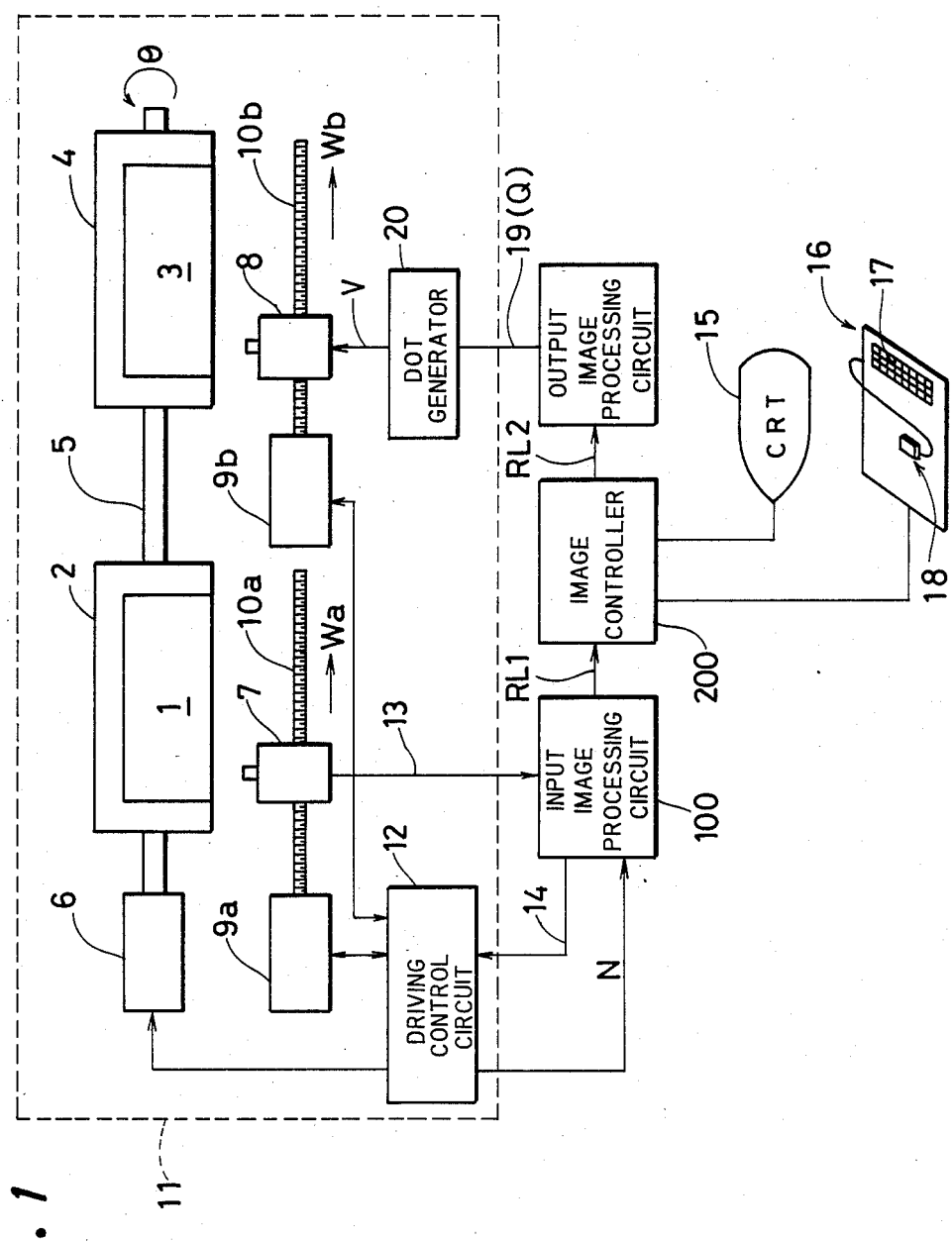
FIG. 1 is an overall block diagram schematically showing an embodiment of the present invention.

FIG. 1 is an overall block diagram of an embodiment of the present invention. Referring to FIG. 1, a negative film 1 bearing contour lines of images is photographically obtained from a comprehensive, which is mounted on the peripheral surface of an original drum 2, whereas a photosensitive material 3 is mounted on that of a recording drum 4. These drums 2 and 4 are mounted on a rotary shaft 5, to be rotated in the direction $\theta$ by a motor 6.

A pick-up head 7 for scanning the negative film 1 is provided in a position opposite to the original drum 2, whereas a recording head 8 is provided in a position opposite to the recording drum 4. The pick-up head 7 and the recording head 8 are respectively engaged with feed screws 10a and 10b which are rotated by motors 9a and 9b respectively, to be moved in the direction $W_a$ and $W_b$ upon rotation of the feed screws 10a and 10b. The motors 6, 9a and 9b are so driven that the pick-up head 7 scans the negative film 1 along sequence of scanning lines and the recording head 8 records on the film 3 along the sequence of scanning lines. An input unit and an output unit of a process scanner 11 are composed of aforementioned components.

Figure 2:
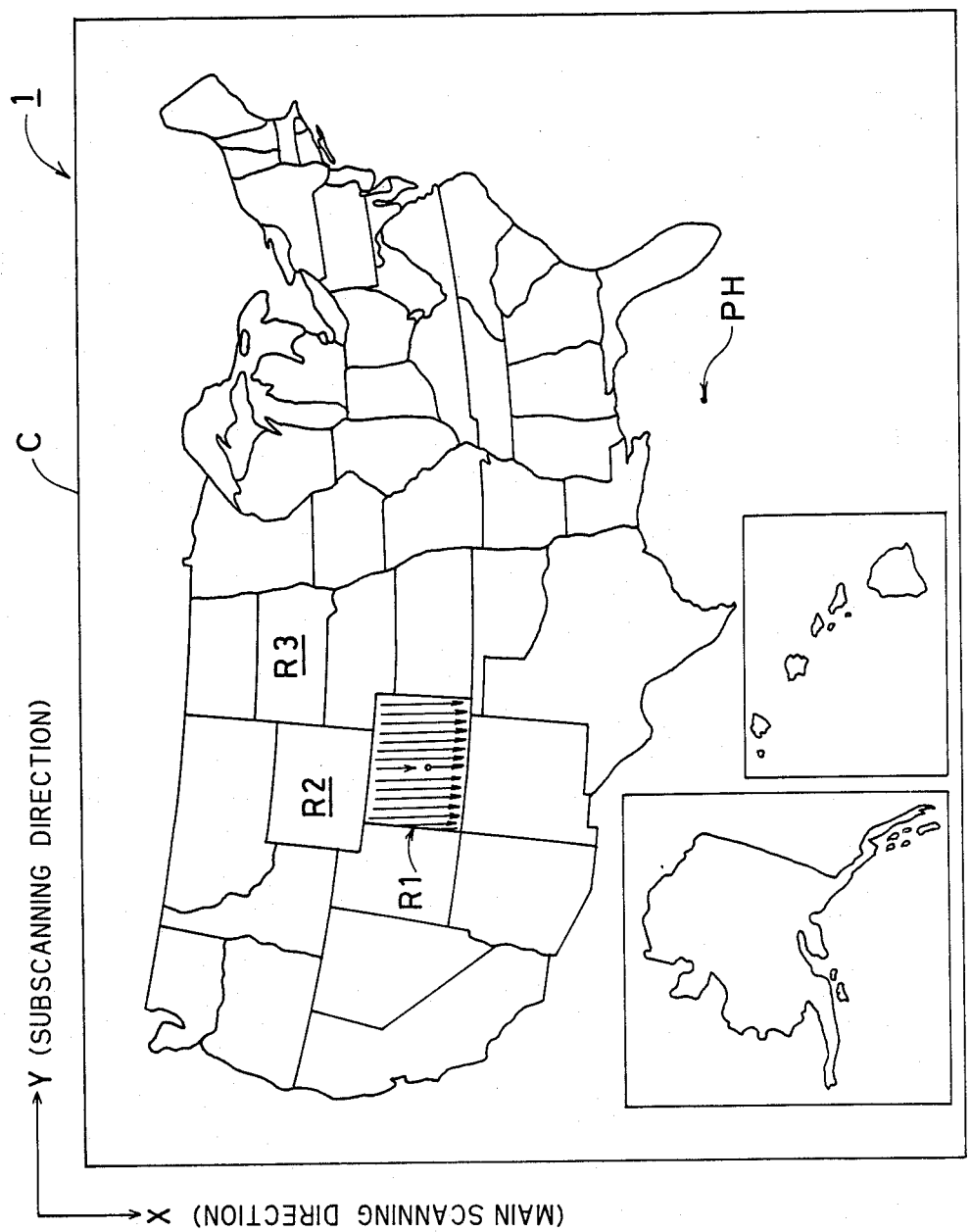
FIG. 2 is a diagram illustrating an example of an original image to be processed.

Image data 13 of the negative film 1, such as a map as shown in FIG. 2, scanned by the pick-up head 7 are inputted to an input image processing circuit 100. The image data 13 are converted to binary image data in the input image processing circuit 100, and are coded into run-length RL1, on which detailed discussion is given later, then the run-length data RL1 are inputted to an image controller 200.

The input image processing circuit 100 outputs control signals 14 to the motors 6, 9a and 9b respectively through a driving control circuit 12. Further, the input image processing circuit 100 is designed to fetch encoded signals from rotary encoders (not shown) respectively connected to the motors 6, 9a and 9b and data N representing the number of feed lines in the subscanning direction through the driving control circuit 12.

The image controller 200 for receiving the coded run-length data RL1 includes a central processing unit (CPU) and a frame memory. The image controller 200 temporarily stores the run-length data RL1 in the frame memory, which are in turn read therefrom to display the image thus obtained on a CRT 15. An operator operates a digitizer 16 provided with a menu sheet 17 and tablet 18 while monitoring the image displayed on the CRT 15, to perform color designation for respective closed regions. Such color designation is made by using coded data through the digitizer 16. In FIG. 2, the closed regions correspond to respective administrative sections (i.e. states) R1, R2, R3, . . . surrounded by contour lines (i.e. boundaries). The region of the sea shown in FIG. 2 can be also treated as one of the closed regions by regarding outer peripheral lines C as one of the contour lines. In FIG. 2, symbol X denotes the main scanning direction and symbol Y denotes the subscanning direction, respectively, of the scanner 11.

Referring back to FIG. 1, run-length data RL2, to which the code data of the color designation in respect of the closed regions are affixed are inputted to an output image processing circuit 300, which in turn obtains halftone-dot percentages corresponding to the designated colors. A dot generator 20 generates outputs V in response to outputs 19 from the output image processing circuit 300, so that the photosensitive material 3 is exposed by the recording head 8 to produce Y, M, C and K separations with desired screen tints.

B. Structure and Operation of Input Image Processing Circuit 100

Figure 3:
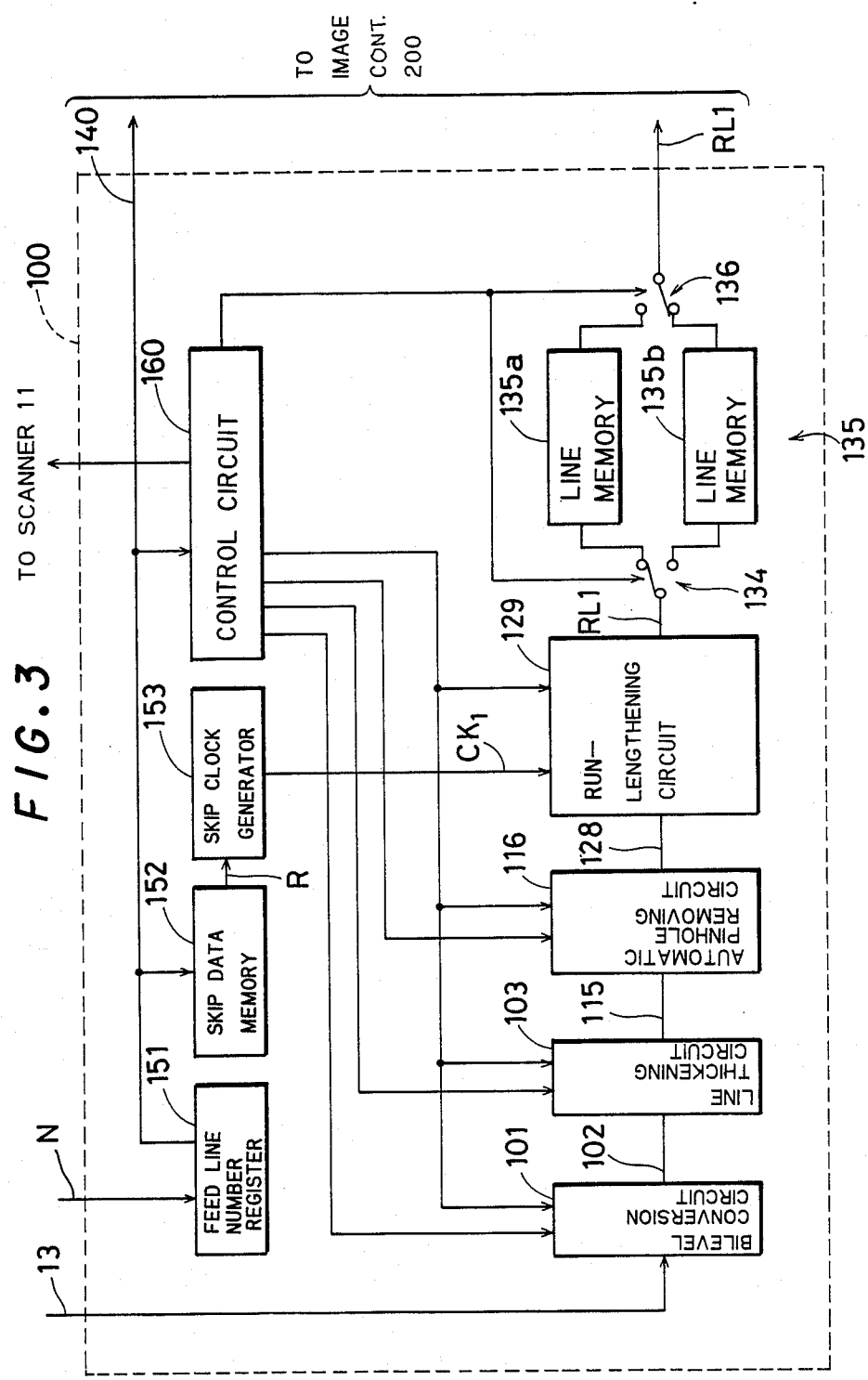
FIG. 3 is a block diagram showing the structure of an input image processing circuit.
Figure 4:
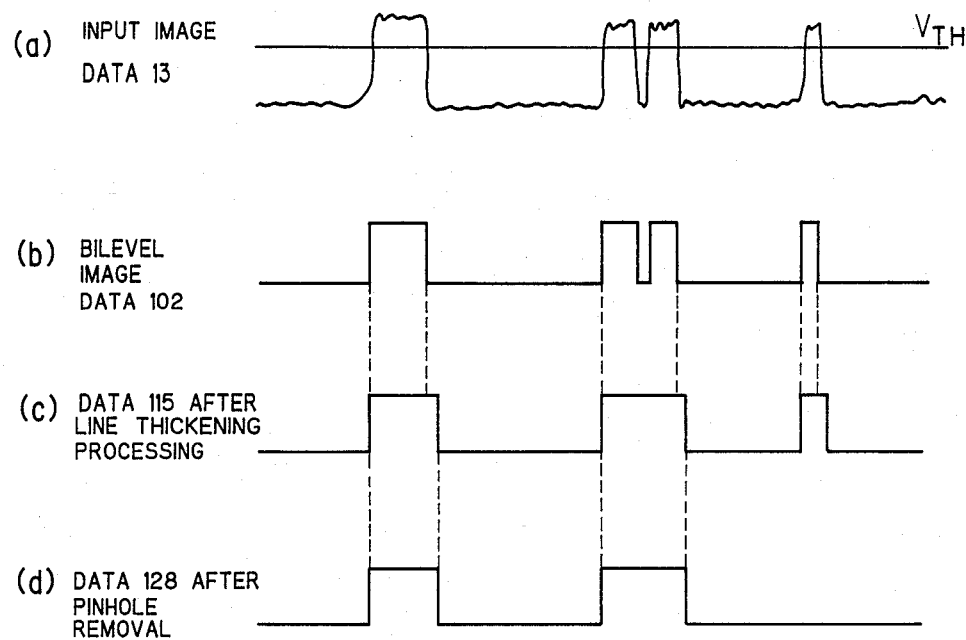
FIG. 4 is a timing chart showing the operation of the input image processing circuit.

FIG. 3 is a block diagram showing the structure of the input image processing circuit 100 in detail. Referring to FIGS. 3 and 4, the input image data 13 inputted from the pick-up head 7 along scanning sequence are inputted to a binary coding circuit 101 and are compared therein with predetermined threshold value $V_{TH}$, thereby being converted into binary signals 102 substantially in real time. In (a) and (b) of FIG. 4, the through put delay of the signals caused during the processing is neglected in order to facilitate understanding of the present invention.

The binary signals 102 are inputted to a line thickening circuit 103, to be subjected to line thickening processing. This processing is performed in order to connect undetected linework gaps e.g. between lines C1 and C2 shown in FIG. 5(a), so as to form a closed contour line. These lines C1 and C2 are originally connected, but such gaps would occur in preparation of a comprehensive or in scanning of the negative film. If such gaps remain, an inner region $R_{in}$ and an outer region $R_{out}$ of the contour lines C1 and C2 are not indentified as different regions, whereby the regions $R_{in}$ and $R_{out}$ cannot be individually designated by different colors. Therefore, the contour lines C1 and C2 are thickened to be connected with each other, thereby to obtain a closed contour line C3 as shown in FIG. 5(b). End portions of the contour lines can be smoothly by such line thickening processing.

Figure 6:
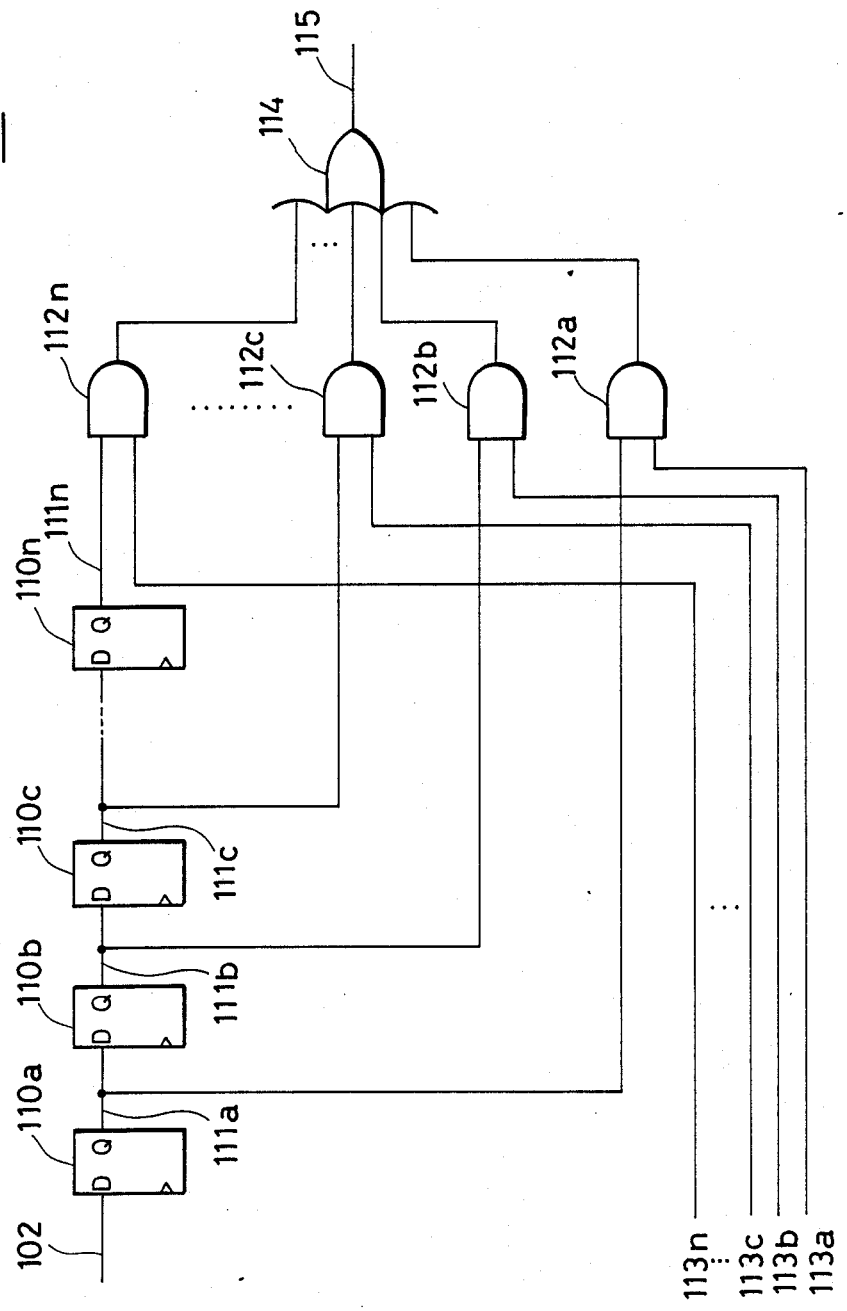
FIG. 6 is a block diagram showing the structure of a line thickening circuit.

FIG. 6 illustrates the structure of a line thickening circuit 103, which is designed to perform the line thickening processing in the main scanning direction. In the line thickening circuit 103, D-flip-flops 110a to 110n (hereinafter referred to as D-FFs) are arranged in series to that respective outputs 111a to 111n thereof are respectively inputted to those subsequent thereto, as well as to AND circuits 112a to 112n. Other input terminals of the AND circuits 112a to 112n receive gate signals 113a to 113n which are outputted from a control circuit 160. Outputs from the AND circuits 112a to 112n are inputted to a single OR circuit 114, which generates an output signal 115.

Thus, when the binary signal 102 is inputted to the D-FF 110a while only the first three gate signals 113a to 113c are "1" and the remaining gate signals 113d to 113n are "0" for example, AND circuits 112a to 112c contribute to the output signal 115.

Figure 5A:
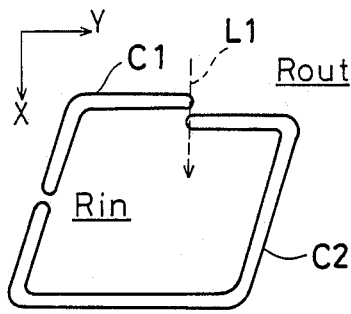
FIG. 5(a) and FIG. 5(b) are explanatory diagrams of line thickening processing.
Figure 5B:
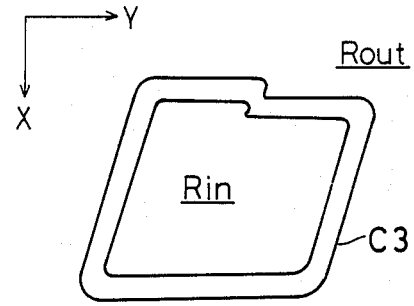
Figure 7:
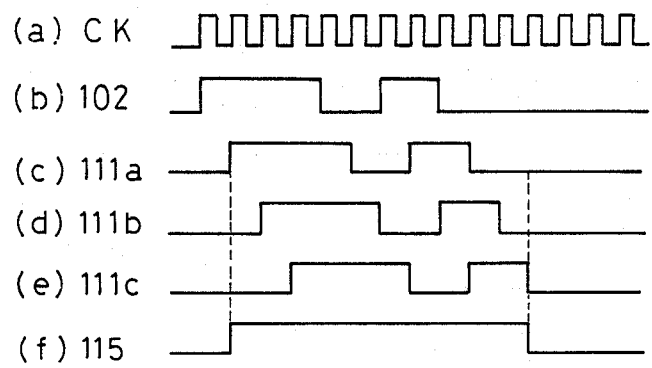
FIG. 7 is a timing chart showing the operation of the line thickening circuit.

Accordingly, in respect of a scanning line L1 shown in FIG. 5(a), the binary signals 102 are processed as shown in FIG. 7(b) for example, relative to clock signals CK. The outputs 111a to 111c of the D-FFs 110a to 110c are respectively delayed by one clock as shown in FIG. 7(c) to (e), which are inputted to the OR circuit 114 through the AND circuits 112a to 112c. Thus, the output of the OR circuit 114 is obtained as shown in FIG. 7(f), whereby the separated contour lines C1 and C2 shown in FIG. 5(a) are connected with each other to obtain the closed contour line C3 shown in FIG. 5(b).

Namely, in this example, each contour line is thickened by two pixels along the main scanning direction, so that contour lines separated by a distance within two pixels can be connected with each other. In such a structure, the number n (n: integer) of the D-FFs 110a to 110n can be arbitrarily selected. However, the line thickening processing is not performed when only a single gate one is made "1".

If desired, such line thickening processing can be also performed in the subscanning direction. In such case, the binary signals 102 of some scanning lines may be temporarily stored in a memory (not shown), to be read therefrom out to obtain OR of the binary signals 102 of some pixels adjacent along the subscanning direction. However, such line thickening processing along the subscanning direction causes delay in the processing of this circuit to some extent, and hence only the line thickening processing in the main scanning direction is performed in this embodiment. FIG. 4(c) shows an example of signal 115 obtained by the line thickening processing.

The signals 115 thus obtained through the line thickening processing are inputted in an automatic pinhole removing circuit 116 as shown in FIG. 3. The automatic pinhole removing circuit 116 is adapted to remove pinholes caused by unwanted dot-shaped defects existing on the negative film 1 and/or caused by noise in image reading from the pick-up head 7.

Figure 8A:
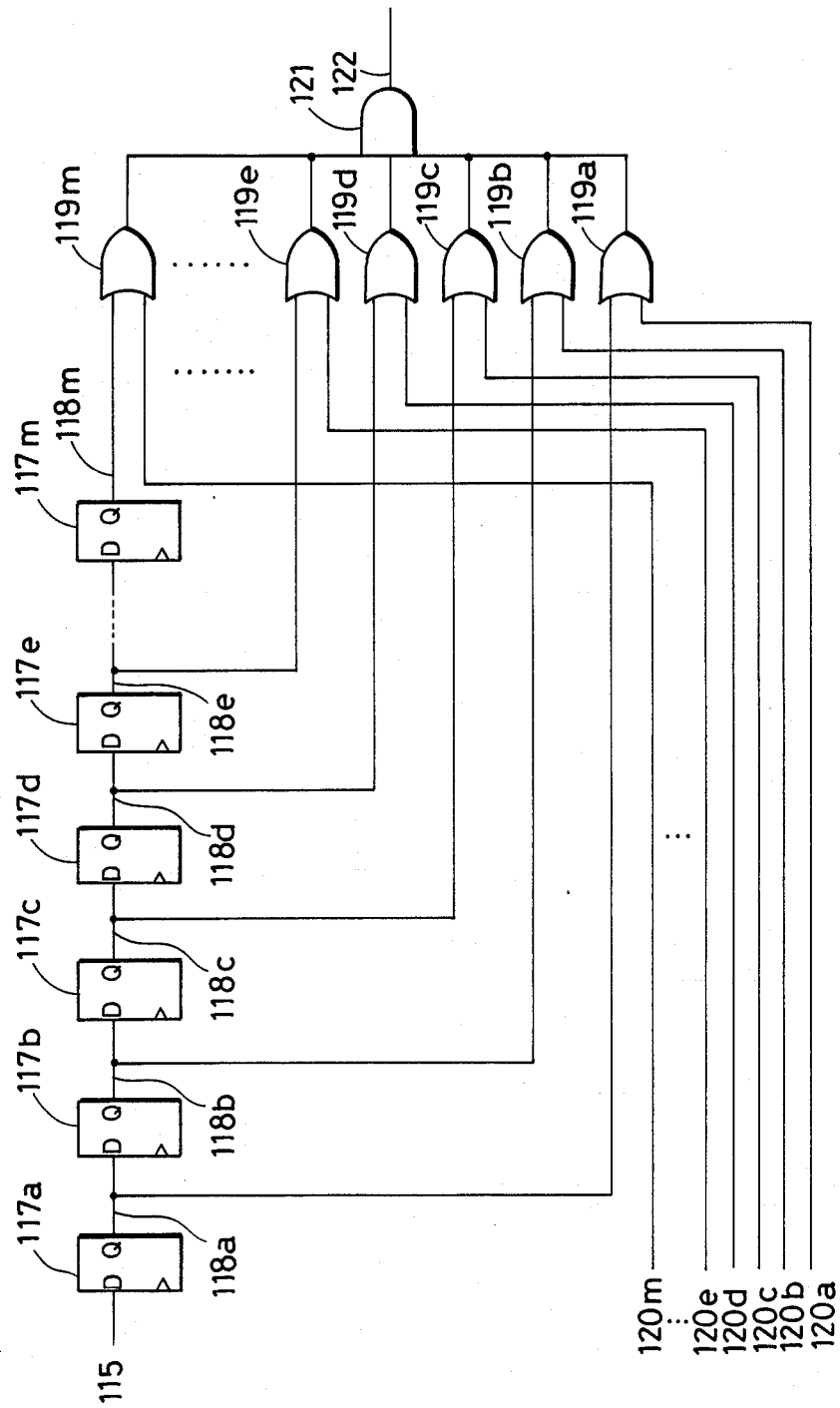
FIGS. 8A and 8B are block diagrams showing the structure of an automatic pinhole removing circuit.
Figure 8B:
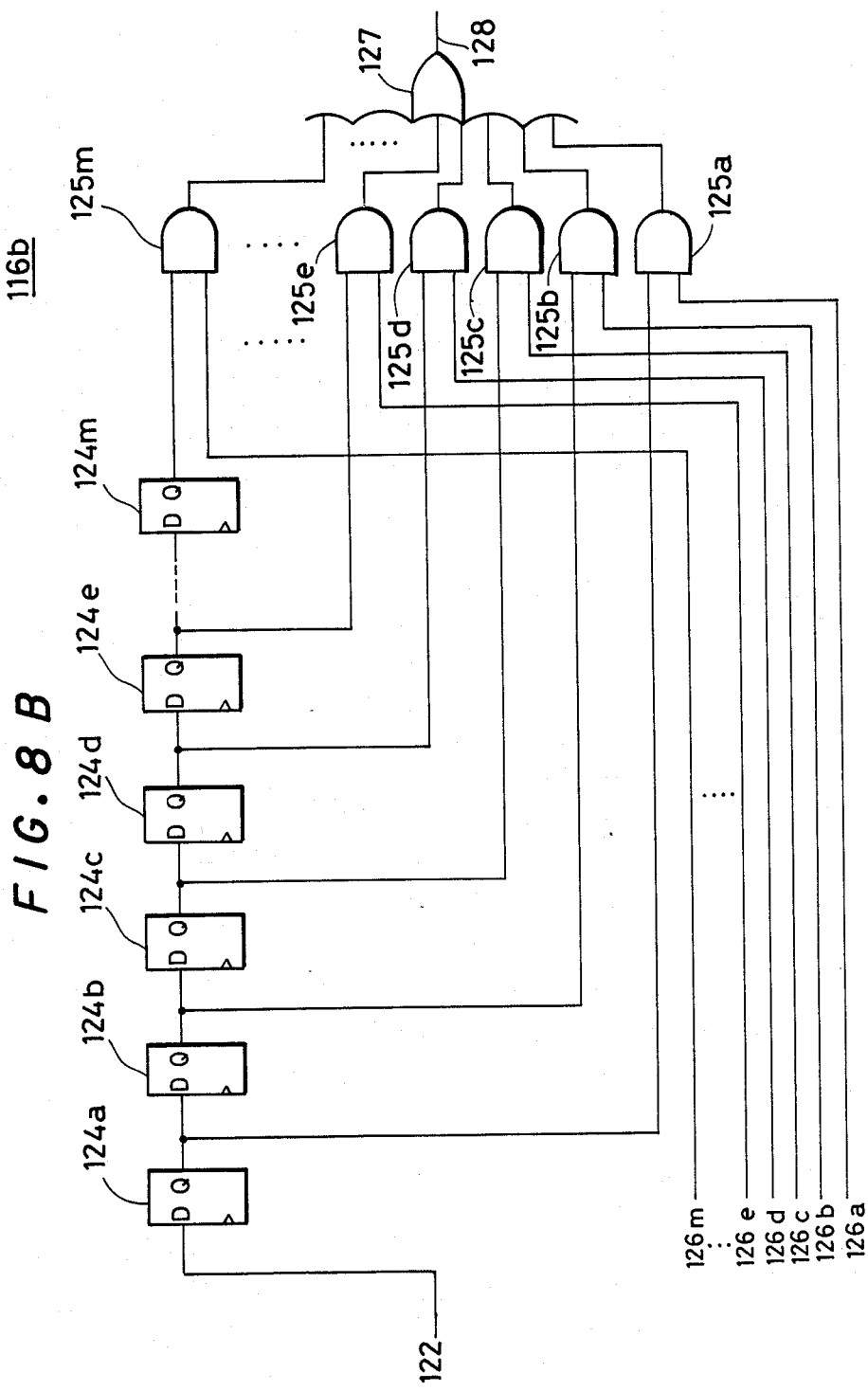

FIGS. 8A and 8B are block diagrams showing the automatic pinhole removing circuit 116, and FIG. 9 is a timing chart showing an operation thereof. As shown in FIG. 8A, the first half portion 116a of the automatic pinhole removing circuit 116 includes, in its initial stage, D-FFs 117a to 117m connected in series. Outputs 118a to 118m thereof are supplied to an AND circuit 121 through OR circuits 119a to 119m, respectively. To the other input terminals of the OR circuits 110a to 119m are inputted pinhole size designating signals 120a to 120m from the control circuit 160 shown in FIG. 3.

Thus, for example, when only the first five signals 120a to 120e of the pinhole size designating signals 120a to 120m are "0" and the remaining signals are "1", the OR circuits other than the OR circuits 119a to 119e continuously output "1". Therefore, an output 122 of the AND circuit 121 becomes "1" only when all of the respective outputs 118a to 118e from the D-FFs 117a to 117e become "1". Thus, the output 122 becomes "1" only when the input signals 115 are continuously inputted "1" to the D-FF 117a over five pixels, whereas the output 122 becomes "0", when the input signal 115 is not inputted "1" thereto continuously over five pixels.

FIG. 9(a) to 9(h) illustrate such operations. A signal A1 which continues to be "1" by four pixels is removed in the signal 122 (FIG. 9(h) by delay operations of the D-FFs 117a to 117e and the AND operation. In another signal A2 which continues to be "1" by nine pixels, five pixels remain in the signal 122 by the AND operation. In this example, therefore, pinholes having lengths smaller than four pixels in the main scanning direction are effectively removed. In other words, such operation is "line narrowing operation" by four pixels.

The second half part 116b of the automatic pinhole removing circuit 116 shown in FIG. 8B is designed to return the line thus narrowed. Therefore, D-FFs 124a to 124m are connected in series to perform line thickening through AND circuits 125a to 125m and an OR circuit 127 similarly to the line thickening circuit 103 of FIG. 6. Among gate signals 126a to 126m for designating the degrees of line thickening, only those corresponding in number to signals to be "0" of pinhole size designating signals 120a to 120m are "1". This is to carry out line thickening by the number of removed pixels in the line narrowing operation.

Therefore, when five signals of the signals 120a to 120e are "0" similarly to the aforementioned example, only five signals 126a to 126e among the signals 126a to 126m are to be "1". Thus, either the signals 126a to 126m or 120a to 120m may be inverted through inverters (not shown) to obtain the others.

Similarly to the line thickening circuit 103, the number of the signals to be made "1" or "0" is arbitrarily determined to designate the maximum size of the pinholes to be removed.

FIG. 9(h) to FIG. 9(n) illustrate such operations, and it is obvious that a signal 128 (FIG. 9(n)) finally outputted from the automatic pinhole removing circuit 116 corresponds to the signal 115, wherein the signal A1 is removed therefrom. FIG. 4(d) shows an example of signal after to pinhole removal.

Figure 10:
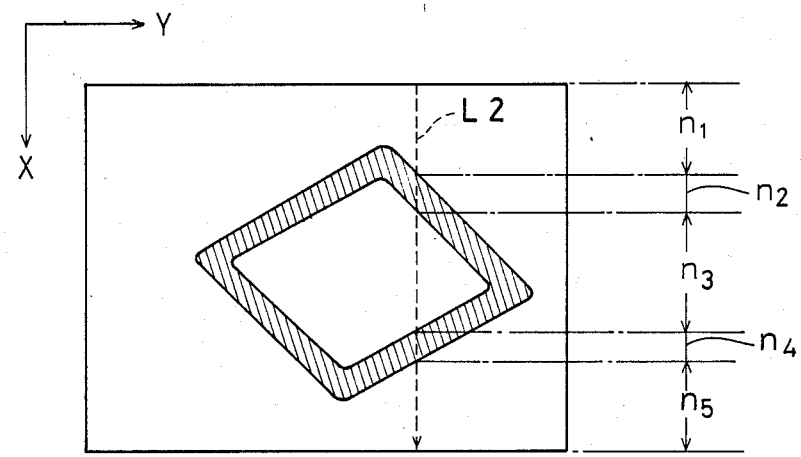
FIG. 10 is an explanatory diagram of run-length coding processing.

The signals 128 thus subjected to pinhole removal are supplied to a run-length coding circuit 129 shown in FIG. 3. With respect to such a closed contour as shown in FIG. 10 for example, pixel data obtained along a scanning line L2 are converted into the following run-length data RL1=(F1,G):

(0, n₁), (1, n₂), (0, n₃), (1, n₄), (0, n₅) where F1 represents flags for designating black or while, such that F1="0" means white and F1="1" means black; and G represents run-length data (n₁, n₂, . . .) indicating pixels to be continued on the scanning line.

Figure 11A:
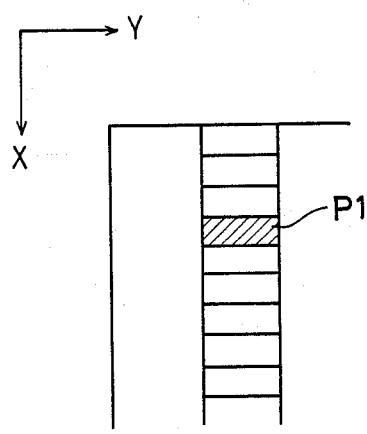
FIG. 11(a) and FIG. 11(b) are explanatory diagrams of rectangular and square pixels.

According to this embodiment, the run-length coding is performed while skipping pixels in the main scanning direction. The reason for this is as follows:

In scanning of the negative film 1 by the scanner 11, the sampling pitch in the main scanning direction is narrowed in order to increase resolution. On the other hand, the sampling pitch in the subscanning direction cannot be much narrowed for preventing the scanning speed from being reduced, since scanning in the subscanning direction is achieved by the screw 10a. Thus, referring to FIG. 11(a), the sampling pitches in the main scanning and subscanning directions become to be different each other, so that each picked-up pixel forms a rectangular pixel P1 extending in the subscanning direction, which is depicted by shaded lines. On the other hand, the image controller 200 of FIG. 1 is designed to process each pixel as a square one. Thus, it is necessary to convert the picked-up rectangular pixel P1 into a square pixel.

Figure 11B:
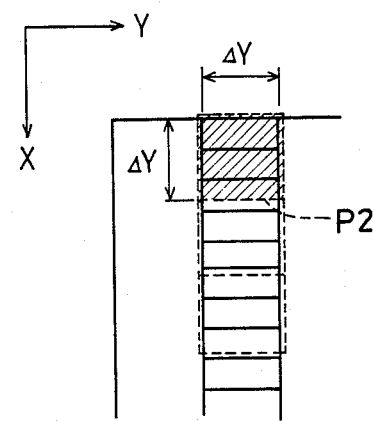

Therefore, as shown in FIG. 11(b), a square pixel P2 (shown by shaded lines) having respective sides which are in length of the subscanning pitch $\Delta Y$ is produced on the basis of the rectangular pixel P1, to perform run-length coding. Such a complete square pixel as shown in FIG. 11(b) is not necessarily obtained in relation with the clock cycle. Accordingly, a pixel approximately in the square shape is also referred to as a "square pixel" hereinafter.

A series of rectangular pixels in the main scanning direction are skippingly fetched to decrease the number of pixels in the main scanning direction. The pixels thus fetched are used in obtaining square pixels P2. When, for example, the pixel pitch $\Delta X$ in the main scanning direction is ½ of $\Delta Y$, pixels affixed by a symbol x shown in FIG. 12(a) are ignored ("black pixels" are shown by shaded lines). Then, the pixels fetched which are affixed by circles, are employed to obtain a series of square pixels P2 as shown in FIG. 12(b).

For such processing, the data representing scanning line number N (line/inch) in the subscanning direction transmitted from the driving control circuit 12 of FIG. 1 to the input image processing circuit 100 of FIG. 3 are fetched by a line register 151 shown in FIG. 3. The scanning line number N is supplied to a skip data memory 152.

The skip data memory 152 includes a clock counter (not shown) for counting the clocks CK and a memory block (not shown) accessed by outputs from the counter. The memory block stores data for designating the pixels to be skipped in the series of the rectangular pixels P1 of one scanning line, in a look-up table system. Hereinafter, such data is referred to as "Skip Data". When the subscanning pitch $\Delta Y=1/N$ (inch) corresponding to the scanning line number N is integral times of the main scanning pitch $\Delta X$, a single "1" and "0" of M-1 are repeatedly represented in the skip data as shown in Table 1, assuming that M represents the aforementioned integer. In Table 1, "0" indicates the pixels to be skipped or ignored and "1" indicates the pixels to be fetched.

TABLE 1

| M | Skip Data |
|---|---|
| 2 | 10101010101010101010 . . . |
| 3 | 1001001001001001 . . . |
| 4 | 1000100010001000 . . . |
| 5 | 10000100001000010 . . . |
| . . . | . . . |

Figure 13:
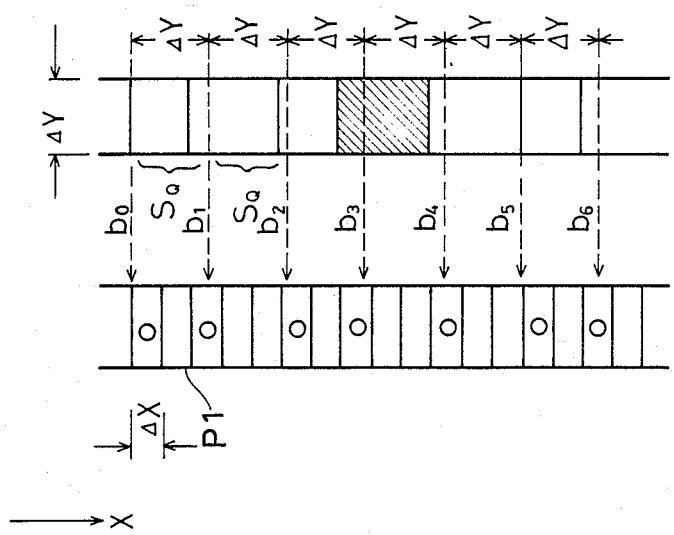

When, on the other hand, the subscanning pitch $\Delta Y$ is not integral times of the main scanning pixel pitch $\Delta X$, the following processing is performed: identifying the pixels, in a series of the rectangular pixels P1, which correspond to boundaries $b_0, b_1, \ldots$ of squares $S_Q$ each having a side of $\Delta Y$ in the main scanning direction, as shown in FIG. 13, and fetching only such pixels to which circles are affixed, thereby remaining pixels in a series of the rectangular pixels P1 being skipped, hence ignored. When boundaries between the adjacent squares $S_Q$ correspond to those between the adjacent rectangular pixels as in the case of $b_0$ and $b_5$ in FIG. 13 for example, a rectangular pixel having larger coordinate value of adjacent rectangular pixels may be selected to be fetched.

Such processing as mentioned above is expressed as follows:

$$(J-1)\cdot \Delta X < I\cdot \Delta Y \leq J\cdot \Delta X \tag{1}$$

where $I=0, 1, 2, 3, \ldots$, which represent the order of the series of the square pixels $S_Q$, and $J=0, 1, 2, 3, \ldots$, which represent the order of the series of the rectangular pixels P1. Assuming that $\alpha$ represents the value of $\Delta Y/\Delta X$, the expression (1) can be transformed as follows:

$$(J-1) < I\cdot \alpha \leq J . \tag{2}$$

The rectangular pixels to be fetched for use in obtaining the series of the square pixels $S_Q$ are determined from the expression (1) or (2).

The skip data obtained by the expression (2) with respect to the values $\alpha$ are listed in Table 2. It can be easily confirmed that Table 1 is obtained from the expression (1) or (2) when $\alpha=M$ (integer). When $\alpha$ is a rational number, a finite sequence of numbers is repeated in the skip data.

TABLE 2

| α | Skip Data |
|---|---|
| 1.5 | 1101101101101101101 . . . |
| 3.5 | 1001000100100010010 . . . |
| 4.4 | 1000100010000100010 . . . |

Figure 14:
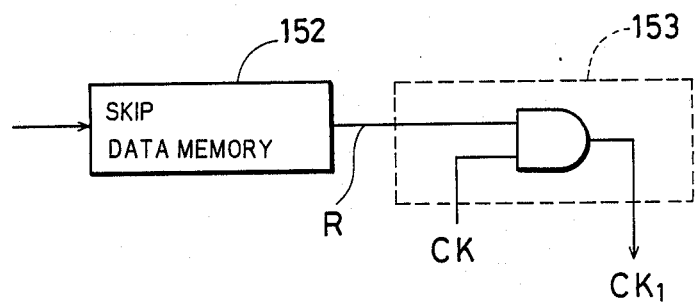
FIG. 14 is a block diagrams showing the structure of a pixel skipping clock generator.

The following description is made in the case of $\alpha=3.5$. In such case, skip data R for one scanning line formed by repeating "1001000" are read from the skip data memory 152 of in FIG. 3, to be supplied to the skip clock generator 153. As shown in FIG. 14, the skip clock generator 153 gates the sampling clocks CK by the skip data R, to generate skip clocks CK1 responsive to the skip data R (FIGS. 15(a) to (c)). It is to be noted that the cycle of the clocks CK in FIG. 14 is shown in different width from that in FIG. 7, for the convenience of illustration. Difference between the skip data R and the skip clocks CK1 is that the former are simply data trains while the latter are time series signals synchronous with the sampling clocks CK.

The skip clocks CK1 are supplied to the run-length coding circuit 129 shown in FIG. 3, which fetches the input data 128 ($D_0$, $D_1$, . . .) on the basis of the skip clocks CK1. The data thus obtained are regarded as data for respective square pixels, to be subjected to run-length coding process.

Figure 15:
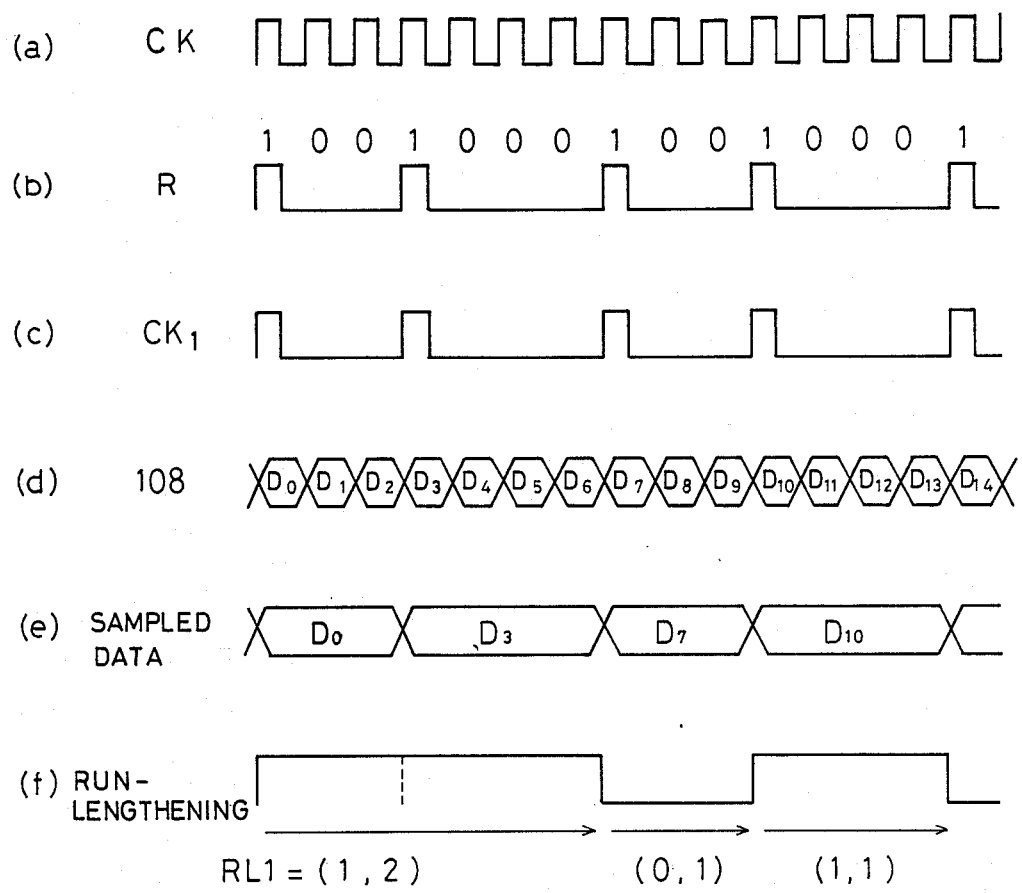
FIG. 15 is an explanatory diagram of data-skipping processing and run-length coding processing.

Therefore, when, for example, the sampled data shown in FIG. 15(e) are in the form shown at FIG. 15(f), run-length data RL1 are obtained as follows:

$$RL1 = (F1, G)$$
$$= (1, 2), (0, 1), (1, 1), \ldots$$

Figure 12:
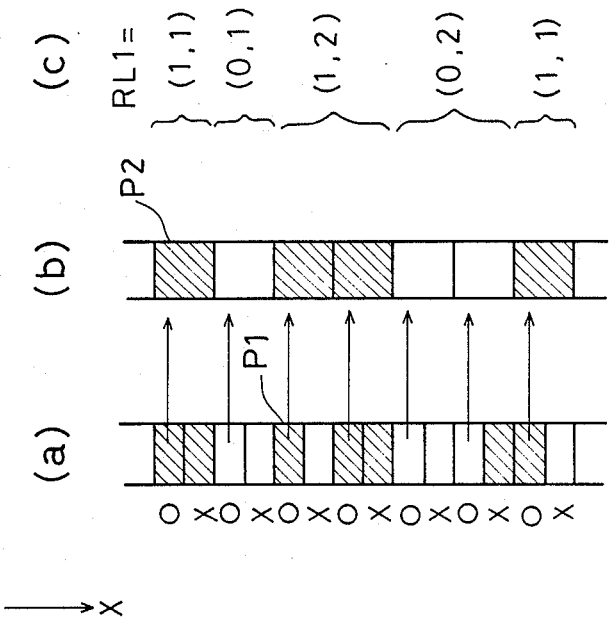
FIGS. 12 and 13 are explanatory diagrams of datas-kipping processing.

For another example shown in FIG. 12, the following run-length data RL1 are obtained, as shown in FIG. 12(c).

$$RL1 = (1, 1), (0, 1), (1, 2), (0, 2), (1, 1), \ldots$$

The run-length data RL1 thus obtained are supplied to a toggle memory 135 of FIG. 3. The toggle memory 135 functions as a buffer memory, and has two line memories 135a and 135b switched by switching circuits 134 and 136. These line memories 135a and 135b alternately repeat writing/reading in each scanning line, to transfer the run-length data RL1 to the image controller 200 of FIG. 1.

C. Structure and Operation of Image Controller 200

Figure 16:
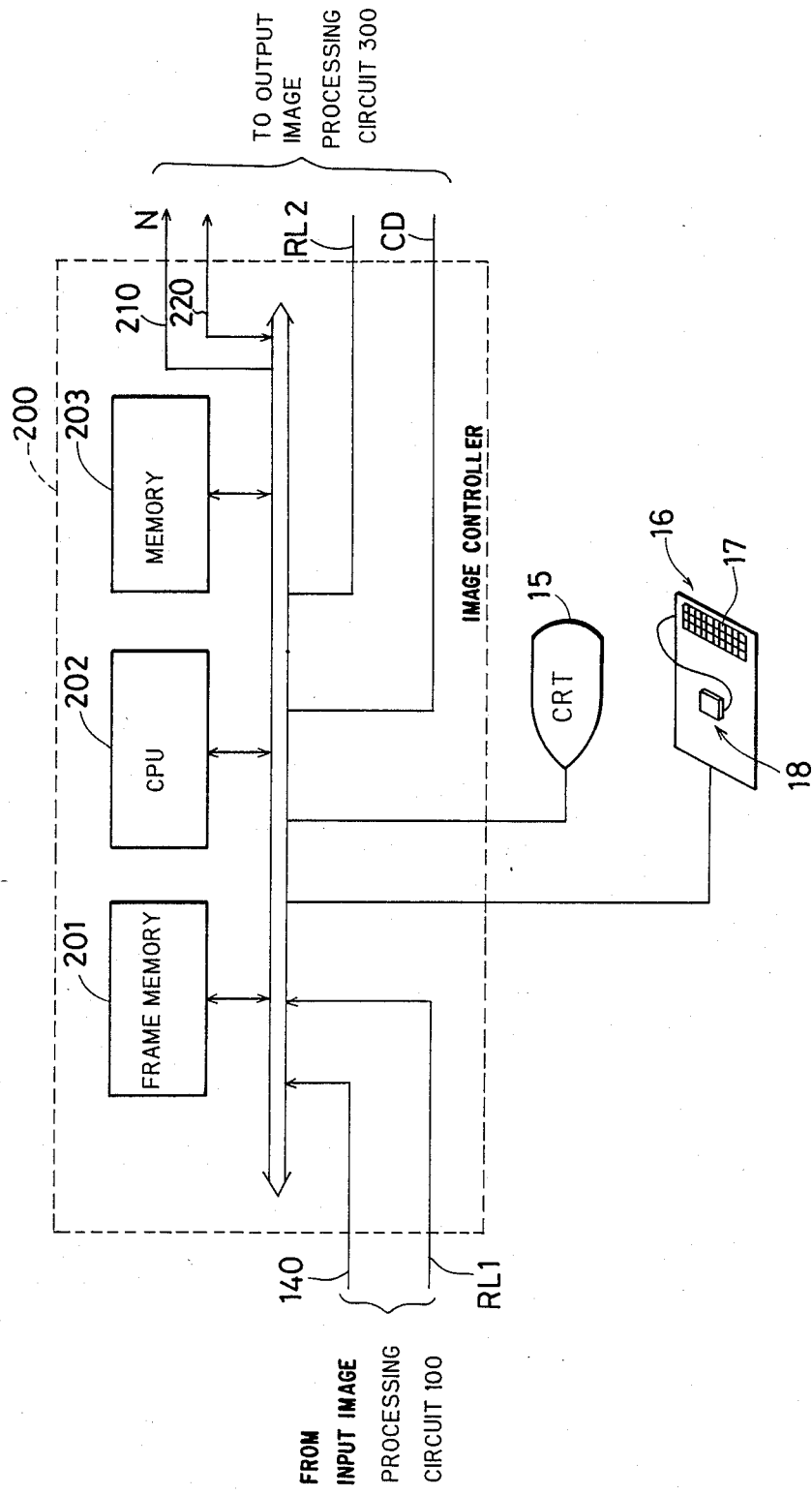
FIG. 16 is a block diagram showing the structure of an image controller.

Referring to FIG. 16, the image controller 200 includes a frame memory 201 for storing the run-length data RL1 from the input image processing circuit 100, a CPU 202 and a memory 203 for storing several data and a program. The CRT 15 and the digitizer 16 are connected to the aformentioned components. The run-length data RL1 are transferred from the input image processing circuit 100 and are stored in the frame memory 201.

Figure 17:
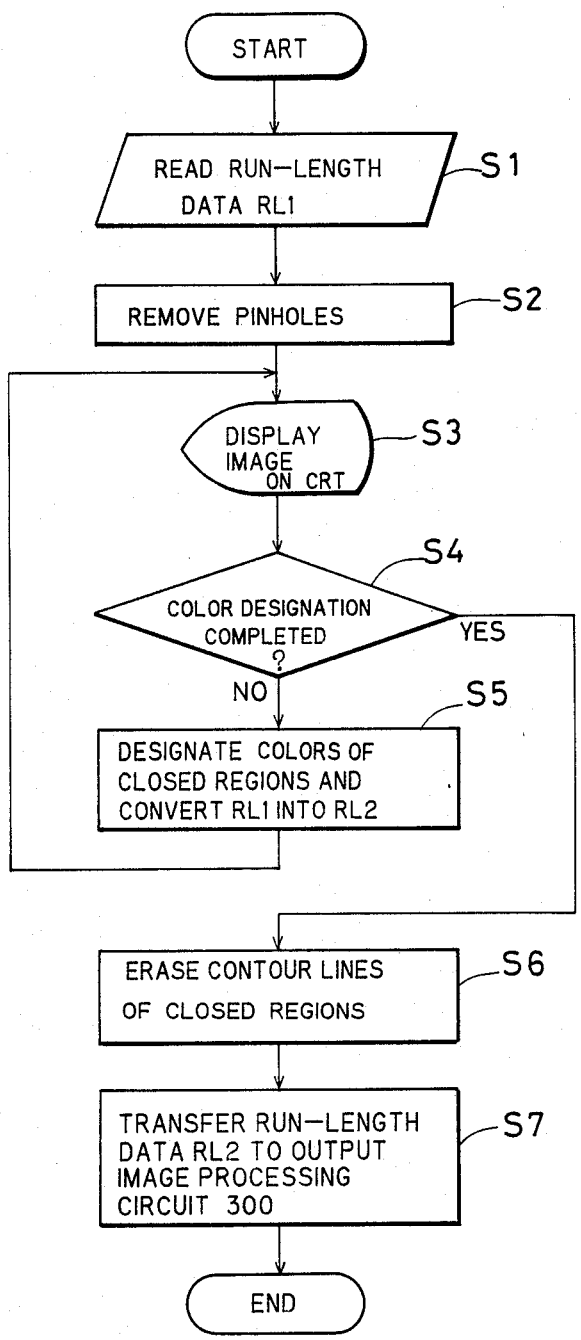
FIG. 17 is a flow chart showing the operation of the image controller.

Referring to FIG. 17, the run-length data RL1 are read from the frame memory 201 (step 1), which are subjected to a pinhole removal processing (step 2). Although the pinhole removal processing has already been performed in the automatic pinhole removing circuit 116 in the input image processing circuit 100, such processing has been merely performed with respect to pinholes being short in length along the main scanning direction. Consequently, there still remain pinholes being relatively large, which are removed at the step 2.

That is, a small region consisting of "black" pixels less than a predetermined number, e.g. fifty pixels, such as a region PH shown in FIG. 2, is discriminated as a pinhole to be removed. In this regard, the discrimination in respect of the region PH is made on the basis of the pixels continuing in the main scanning and/or subscanning directions. According to this embodiment, thus, pinhole removal processing is performed twice in respect of the length of a series of pixels in the main scanning direction and the extent of pixels respectively, so that pinhole removal is effectively improved by such double processing.

The contour image after pinhole removal is displayed on the CRT 15 (step 3). Then, it is decided whether color designation of the respective closed regions is completed (step 4), and if not, color designation of the regions is performed while the operator is visually recognizing the image displayed on the CRT 15 (step 5). In this regard, when color designation is performed on the region R1 of FIG. 2, for example, an arbitrary point within the region R1 is designated by the tablet 18. Then, coded data representing a desired color and a desired tone to be given to the region R1, are designated by the operator through ten keys provided on the menu sheet 17.

In such color designation, color codes "0" to "255" are arranged to correspond to combinations of halftone-dot percentage with respect to yellow (color Y), magenta (color M), cyan (color C) and black (color K) as shown in Table 3, for example.

TABLE 3

| Color Code | Color Y | Color M | Color C | Color K |
|---|---|---|---|---|
| 0 | 0 | 0 | 0 | 0 |
| 1 | 0 | 0 | 0 | 100 |
| 2 | 50 | 50 | 0 | 0 |
| 3 | 90 | 20 | 0 | 10 |
| 4 | 0 | 50 | 50 | 0 |
| ... | ... | ... | ... | ... |
| 255 | 0 | 50 | 50 | 0 |

Such color code as shown in Table 3 may fixedly be settled for use in the color designation. However, halftone-dot percentages corresponding to respective color codes can be corrected or changed, in this embodiment, either during the color designation processing or before it. Such correction is performed through the menu sheet 17 and the tablet 18, for example.

Synchronously with the color designation, the run-length data RL1 are converted into run-length data RL2 corresponding to the designated colors (step 5).

With such color designation, the region R1 displayed on the CRT 15 is filled with the designated color (step 3). A small white circle in this closed region R1 denotes a point designated by the tablet 18. In order to perform this, the memory 203 shown in FIG. 16 stores such data as shown Table 3.

Both color designation and data conversion from RL1 to RL2 are repeatedly performed in respect of remaining regions R2, R3, . . . After that, line narrowing processing is performed to erase the contour lines of the respective regions (step 6), which the line narrowing is made on the basis of a reverse principle of the aforementioned line thickening processing.

In respect of the run-length data RL2=(F2, G) thus obtained, the color designating flags F2 are to be converted from the black-and-white designating flags F1 of the run-length data RL1. Namely, the flags F1 initially having designation data of F1="0" (white) or F1="1" (black) are converted into 256 kinds of color designating flags F2 indicated by color codes. For example, when the region R1 of FIG. 2 is designated by the color code number "3", the run-length data RL1 of this region R1 is converted into RL2=(3, G). Although the run-length value G would also be changed due to the processing of erasing contour lines, here is nevertheless expressed by the same symbol G for the convenience of explanation.

According to this embodiment, 256 colors represented by the code data of "0" to "255" can be expressed, whereby the color designation flags F2 are of any values of "0" to "255". The run-length data RL2 obtained are transferred to the output image processing circuit 300 (step 7), whereby processing in the image controller 200 is completed.

The run-length data RL2 may be stored in an external memory or the like.

D. Structure and Operation of Output Image Processing Circuit 300

Figure 18:
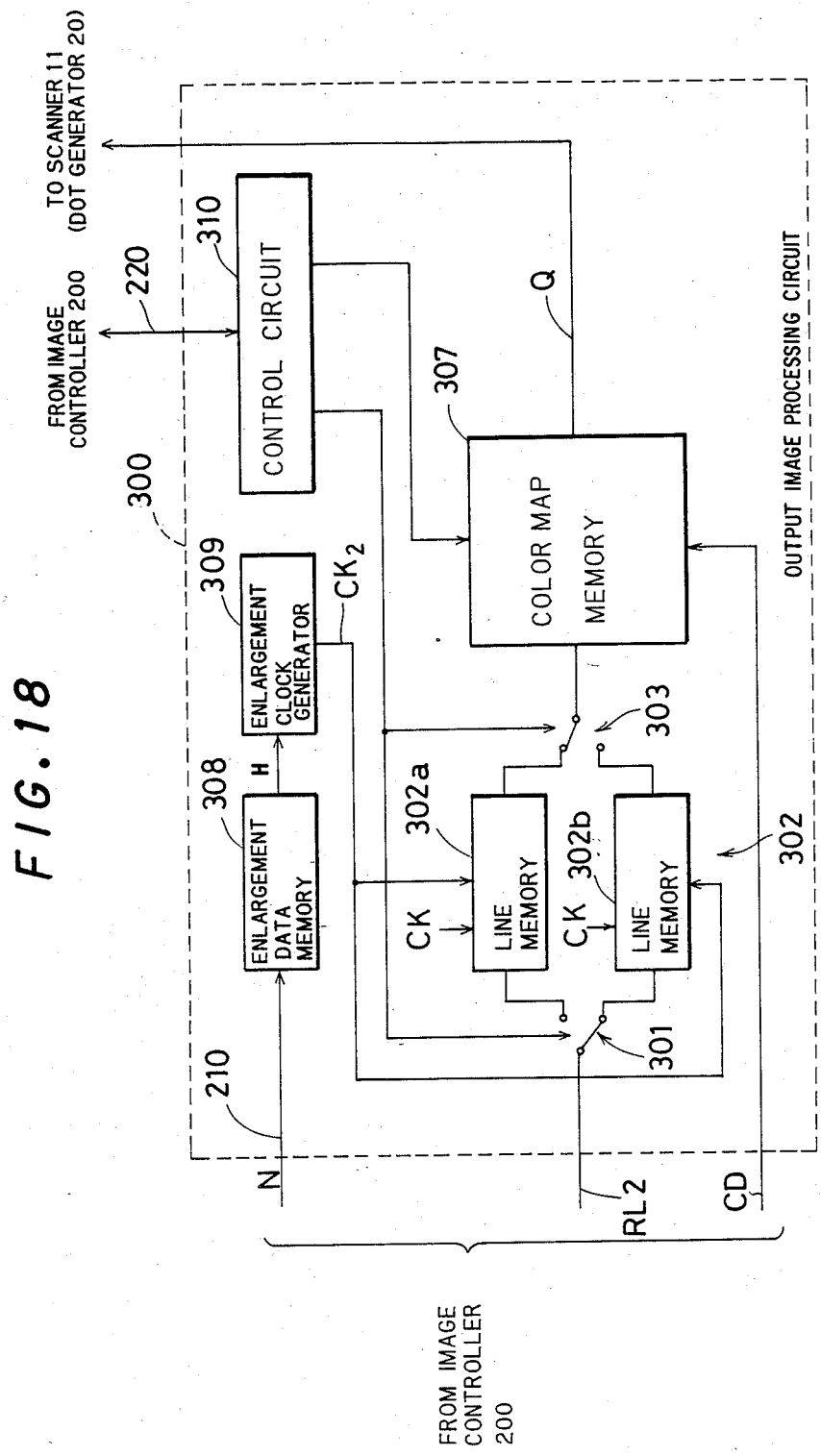
FIG. 18 is a block diagram showing the structure of an output image processing circuit.

FIG. 18 is a block diagram showing the structure of the output image processing circuit 300. Referring to FIG. 18, the run-length data RL2 transferred from the image controller 200 are inputted to a toggle memory 302. This toggle memory 302 includes two line memories 302a and 302b alternately switchable by switchable circuits 301 and 303, wherein line memories 302a and 302b are alternately used for writing and reading of run-length data RL2 for each scanning line. Writing of the run-length data RL2 into the line memories 302a and 302b is performed, as in a usual manner, in accordance with the sampling clocks CK. On the other hand, reading processing therefrom is carried out in a different manner from a usual one.

Figure 19:
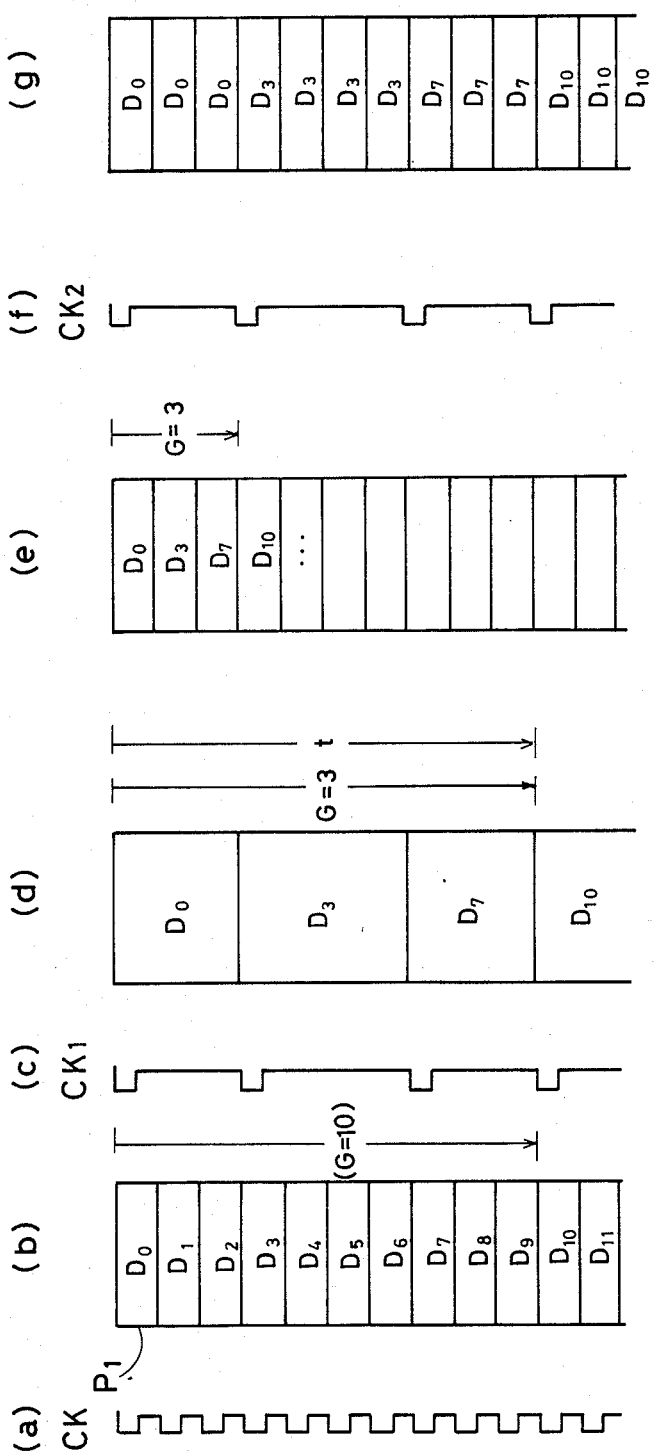
FIG. 19 is an explanatory diagram illustrating a relation between input pixel data and recording data.

Before explaining the reading processing, description is made on the premise thereof, i.e., relationship between recording data Q for tint generation to be supplied to the dot generator 20 and the input image data initially inputted to the input image processing circuit 100. Referring to FIG. 19, the image data initially inputted to the input image controller 100 are in the form of bit series $D_0, D_1, \ldots$ of rectangular pixels P1 (FIG. 10(b)). As described hereinabove, these pixels are skippingly fetched in response to the skip clocks $CK_1$ (FIG. 19(c)), thereby a series of the square pixels P2 (FIG. 19(d)) as "skipped image data" are obtained.

Although the series of the square pixels P2 is expanded on time scale, while the size of the pixels itself can be ignored, since the processing is performed on the basis of the run-length coded data in the image controller 200. Accordingly, what is important for the processing is the number of pixels to be of an identical color along the scanning direction. Therefore, when, for example, three pixels $D_0$, $D_3$ and $D_7$ in FIG. 19(d) are designated as an identical color, the run-length value G is to be G=3.

On the other hand, the dot generator 20 is actuated by the sampling clocks CK (FIG. 19(a)), and hence the image to be recorded is disadvantageously compressed in the main scanning direction, as shown in FIG. 19(e) when the aforementioned run-length data G=3 is employed as it is for use in the recording data Q. Therefore, the pixels must be expanded in the main scanning direction before being outputted to the dot generator 20. Thus, the line memories 302a and 302b shown in FIG. 18 are designed to perform data reading while carrying out such pixel-expansion processing.

Figure 20:
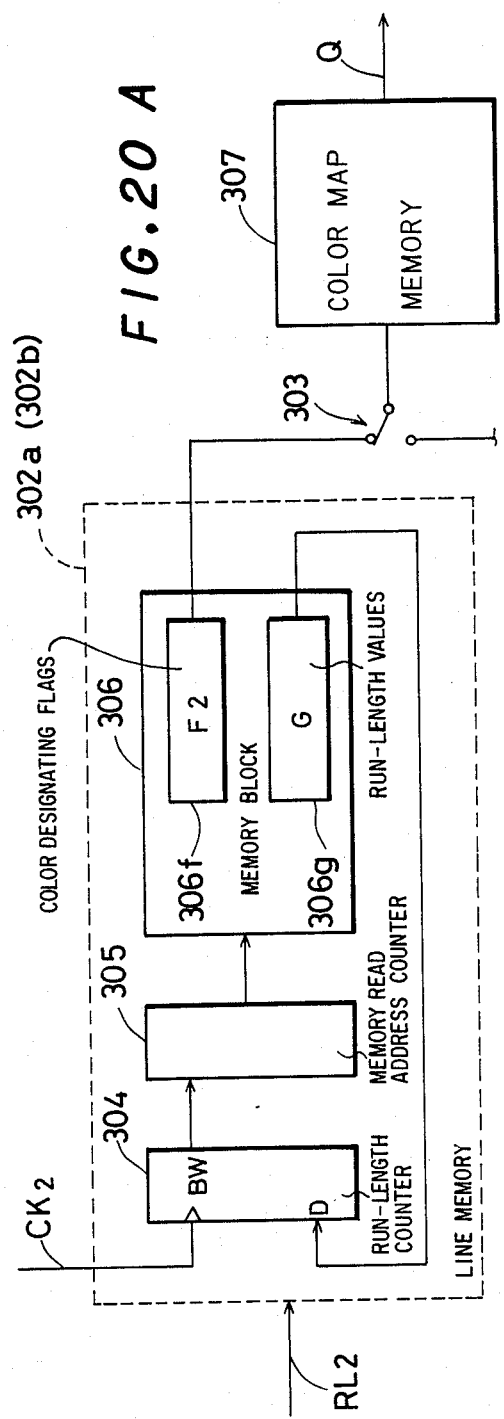
FIGS. 20A and 20B are block diagrams the structure of line memories 302a and 302b, respectively.
Figure 20:
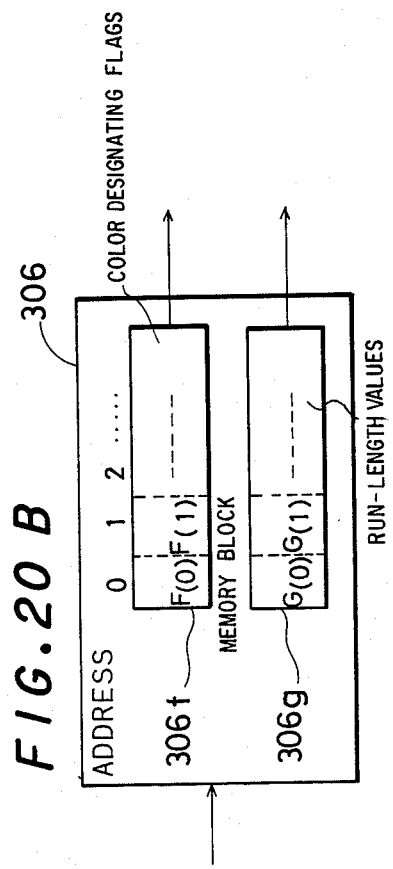

Description is now made on the reading processing with reference to the case where reading operation from the line memory 302a is performed. FIG. 20A is a block diagram showing the structure of the line memory 302a relating to the reading processing. The other line memory 302b is in the same structure. The line memory 302a includes a run-length counter 304, a memory read address counter 305 and a memory block 306. The run-length counter 304 is formed by a presettable down counter. The memory block 306 is divided into a first storage area 306f for storing the color designating flags F2 of the run-length data RL2 and a second area 306g for storing the run-length values G.

The clocks $CK_2$ generated by an enlargement clock generator 309 are supplied to the run-length counter 304. The clocks $CK_2$ are generated in the same manner as the skip clocks $CK_1$ generated in the input image processing circuit 100. Namely, the feed line number N registered in the feed line number register 151 is supplied to the image controller 200 through a transfer line 140, which is transferred from the image controller 200 to an enlargement data memory 308 through a transfer line 210.

The enlargement data memory 308 and the enlargement clock generator 309 are substantially identical in structure with the skip data memory 152 and the skip clock generator 153 shown in FIG. 3, respectively. The data trains listed in Tables 1 and 2 are previously stored in the data memory 308, and one of which is selected in response to the feed line number N. Accordingly, a data train H (=R) shown in FIG. 21(b) is given from the data memory 308 to the clock generator 309 when $a=3.5$, so that he clock generator 309 generates the clocks $CK_2$ shown in FIG. 21(c).

in such structure, the run-length counter 304 of FIG. 20A is loaded with the run-length value G(0) stored in the initial address "0" of the second storage area 306g. The value F(0) of the color designating flag F2 stored in the address "0" is outputted to a color map memory 307 from the first storage area 306f through a toggle switch 303 (FIG. 21(e) to (g)). The run-length counter 304 commences to count by "−1" from the loaded run-length value G(0) in response to clocks $CK_2$. During such counting, the address output of the address counter 305 remains "0", and hence the color designating flag F(0) is continuously outputted to the color map memory 307.

When such down counting so progresses that the count value of the run-length counter 304 becomes "0", the run-length counter 304 outputs a borrow signal BW to the address counter 305 (FIG. 21(d) and (g)). It is to be noted that FIG. 21 illustrates the case of G(0)=2.

Then, the address counter 305 counts by "+1", to supply a new address output "1" to the memory block 306. In response to this, the value F(1) is outputted as the color designating flag F2 from the first storage area 306f of the memory block 306. The value G(1) is also outputted as run-length value G output from the second storage area 306g, which is loaded in the run-length counter 304. Then, counting is commenced again therein similarly as mentioned above.

Such operation is repeated until all the data of one scanning line stored in the memory block 306 are completed. Upon completion of the reading, read/write operations of the line memories 302a and 302b are inverted. Thus, the color map memory 307 is supplied with the color designating flags expanded on time scale as shown in FIG. 21(g).

The color map memory 307 is supplied with color map data CD shown in Table 3 representing relationship between the color designating flags F2, i.e., the color codes (code data) and halftone-dot percentages of desired tint with respect to the color separations Y, M, C and K, from the image controller 200. The color map data CD are stored in the color map memory 307 in a look-up table system.

Thus, when, for example, F2="2" is inputted thereto when recording the Y separation, recording data Q representing "halftone-dot percentage: 50" is outputted from the color map memory 307 according to Table 3.

In this regard, the output duration of the recording data Q corresponds to the run-length value G. Therefore, in the case of G=3 illustrated in FIG. 19, the identical recording data Q is continuously outputted for a time t shown in FIG. 19(d) since the skip clock $CK_1$ is identical to the clock $CK_2$.

Thus, when the recording data Q is supplied to the dot generator 20, the recording output V of halftone-dot precentages corresponding to the designated color code is given to the recording head 8 for such time in the form of halftone dot output. Thus, such an image as shown in FIG. 19(g) is recorded on the recording film 3 in the form of a series of rectangular pixels, whereby a halftone separation with desired tint is produced.

Although the aformentioned processing is given in respect of Y separation, similar processings are repeatedly carried out in respect of the M, C and K separations. When recording these separations M, C and K, respective halftone-dot percentages corresponding to respective separations are switchably outputted from the memory 307, which the respective halftone percentages are stored therein as color map data CD shown in Table 3. Such outputs of respective halftone-dot percentages are carried out by switching access areas to the memory 307 according to a desired separation, on the basis of a control signal 220 supplied from the image controller 200 to a control circuit 310. When recording the respective color separations, the run-length data RL2 of the respective color separations are repeatedly outputted from the line memories 302a and 302b while changing the access area to the color map memory 307.

The skip clocks and enlargement clocks have been employed in the aforementioned embodiment since the pixels to be processed in the processing circuit 100 and 300 are different in size along the main and subscanning directions. However, when the pixels are identical in size, these special clocks are not required, and accordingly such skip processing as shown in FIGS. 12 and 13 may be omitted.

Although the above embodiment has been described in a case of effecting tint generation in respective closed regions with different colors, the present invention is also applicable to monochromatic recording with gradation. Further, the present invention is applicable to a case wherein color recording with different screen tints is made, to which a desired gradation is given.

From the description hereinabove, it is apparent that the present invention leads practically advantageous effects as follows:

Since the data to be processed are extremely compressed after run-length coding in comparison with the pixel data obtained by scanning of the negative film 1 bearing contour lines thereon, no large memory capacity is required for the memory.

Contraction or expansion of the image along the subscanning direction can also be corrected by repeatedly reading the same data or skippingly reading the image data, since the image data on the entire image to be processed are stored as run-length coding data.

Further, since externally designated colors and/or gradation of tints to be effected in respective regions are supplied as code data to first run-length data RL1 to generate the run-length data RL2, the output image processing circuit 300 outputs the recording data on the basis of the run-length values. Thus, tint generation can be readily and correctly effected in desired regions of an image.

Although the present invention has been discribed and illustrated in detail on a specific preferred embodiment, it is clearly understood that the same is by way of illustration and example only and is not to be taken by way of limitation, the spirit and scope of the present invention being limited only by the terms of the appended claims.

We claim:

1. A method of tint generation, comprising the steps of:
    (1) preparing an original image bearing contour lines thereon which define respective regions of said original image;
    (2) scanning said original image for obtaining pixel data thereof;
    (3) converting said pixel data into binary data with reference to a predetermined threshold level, thereby discriminating pixels of said contour lines from other pixels of said original image;
    (4) thickening of the contour lines by processing the binary data, thereby connecting gaps in the contour lines to form closed regions;
    (5) converting said binary data into first run-length data;
    (6) displaying a display image on a display means in response to said first run-length data;
    (7) designating desired colors to respective regions of said display image corresponding to the regions of the original image while monitoring said display image;
    (8) affixing color code data representing the desired colors to said first run-length data in accordance with the designation of said desired colors to the respective regions of the display image, thereby obtaining second run-length data;
    (9) obtaining recording data, representing halftone-dot percentages corresponding to one or more color separations, on the basis of said color code data affixed to said second run-length data; and
    (10) recording one or more color separations on a photosensitive material in accordance with said recording data, wherein the one or more recorded color separations can be used to produce an output image in which regions corresponding to the regions of the original image have tints corresponding to the desired colors designated to the respective regions of the display image.

2. A method of tint generation as set forth in claim 1, and between steps (4) and (5) further comprising the step of:
    eliminating unwanted pinholes by removing data from the binary data representing pinholes having a number of pixels in a main scanning direction which is less than a predetermined number, said pinholes being represented in the original image as contour lines.

3. A method of tint generation as set forth in claim 2, wherein the elimination of unwanted pinholes is carried out by:
    designating a predetermined number of pixels;
    narrowing the contour lines in the main scanning direction by the predetermined number of pixels thus designated by processing the binary data, thereby eliminating pinholes having a number of pixels in the main scanning direction which is less than the predetermined number; and thickening the contour lines in the main scanning direction by the predetermined number of pixels thus designated by processing the binary data.

4. An apparatus for effecting tint generation in respective regions of an output image to be produced, comprising:

scanning means for obtaining pixel data of an original image, said original image bearing contour lines of respective regions thereof;

first converting means for converting said pixel data into binary data, thereby discriminating pixels of said contour lines from other pixels of said original image;

line thickening means for thickening pixels of the contour lines by processing the binary data, thereby connecting gaps in the contour lines to form closed regions;

second converting means for converting the binary data into first run-length data;

color designating means for designating desired colors to respective ones of the regions of the original image, said designation of colors being performed using color code data representing the desired colors;

third converting means for converting said first run-length data into second run-length data by affixing said color code data to the first run-length data;

means for obtaining recording data, representing halftone-dot percentages corresponding to one or more color separations, on the basis of said color code data; and means for recording one or more color separations on a photosensitive material in accordance with said recording data, wherein the one or more recorded color separations can be used to produce an output image in which regions corresponding to the regions of the original image have tints corresponding to the desired colors designated to the respective regions of the original image.

5. An apparatus for effecting tint generation as set forth in claim 4, further comprising means for eliminating unwanted pinholes by removing data from the binary data representing pinholes having a number of pixels in a main scanning direction which is less than a predetermined number, wherein said eliminating means comprises:

means for designating a predetermined number of pixels;

a plurality of D flip-flops connected in series;

OR gates connected to respective ones of said D flip-flops and said designating means; and an AND gate connected to said OR gates;

said designating means, said D flip-flops, said OR gates, and said AND gate cooperating to narrow the contour lines in the main scanning direction by the predetermined number of pixels thus designated by processing the binary data, thereby eliminating pinholes having a number of pixels in the main scanning direction which is less than the predetermined number.

6. An apparatus for effecting tint generation as set forth in claim 5, wherein said eliminating means further comprises:

second means for designating a second predetermined number of pixels;

a second plurality of D flip-flops connected in series;

AND gate leans connected to said second plurality of D flip-flops and said second designating means; and a single OR gate connected to said AND gate means;

said second designating means, said second plurality of D flip-flops, said AND gate means, and said single OR gate cooperating to thicken the contour lines in the main scanning direction by the second predetermined number of pixels thus designated by processing the binary data.

7. An apparatus for effecting tint generation as set forth in claim 4, further comprising monitor means for displaying a display image in response to said first run-length data, wherein an operator uses the color designating means to designate the desired colors to the respective regions of the original image by designating the desired colors to corresponding regions of the display image while monitoring the display image.

8. An apparatus for effecting tint generation in respective regions of an output image to be produced, comprising:

original mounting means for mounting an original image thereon, said original image bearing contour lines of respective regions thereof;

photosensitive material mounting means for mounting a photosensitive material thereon;

respective first driving means connected to said original mounting means and said photosensitive mounting means for driving the same in respective main scanning directions;

pick-up means provided opposite to said original mounting means for obtaining pixel data of said original image;

recording means provided opposite to said photosensitive material mounting means for recording one or more color separations on said photosensitive material;

respective second driving means connected to said pick-up means and said recording means for driving the same in respective sub-scanning directions;

respective driving control means connected to said first and second driving means for controlling driving thereof;

first image data processing means connected to said pick-up means and the respective driving control means for processing the pixel data of the original image obtained by said pick-up means to convert said pixel data into first binary run-length data;

second image data processing means connected to said first image data processing means for processing said first binary run-length data to convert said first binary run-length data into second binary run-length data having coded data representing desired colors designated to respective regions of said original image;

third image data processing means connected to said second image data processing means for processing said second run-length data to obtain halftone-dot percentages corresponding to one or ore color separations;

dot generating means connected to said third image data processing means and said recording means for generating halftone dot data on the basis of said halftone-dot percentages; and means for controlling said recording means to record one or more color separations on said photosensitive material in accordance with the halftone dot data, wherein the one or more recorded color separations can be used to produce an output image in which regions corresponding to the regions of the original image have tints corresponding to the desired colors designated to the respective regions of the original image.

* * * * *